March 12, 1935. W. B. FULTON 1,994,098
MEANS FOR DEFORMING OR COMPRESSING FLEXIBLE MEMBERS
Filed Oct. 6, 1932
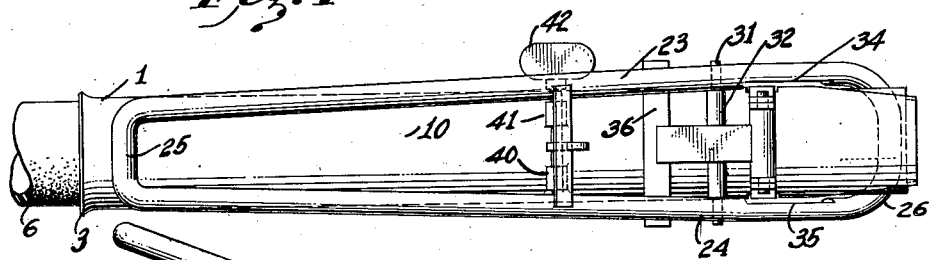
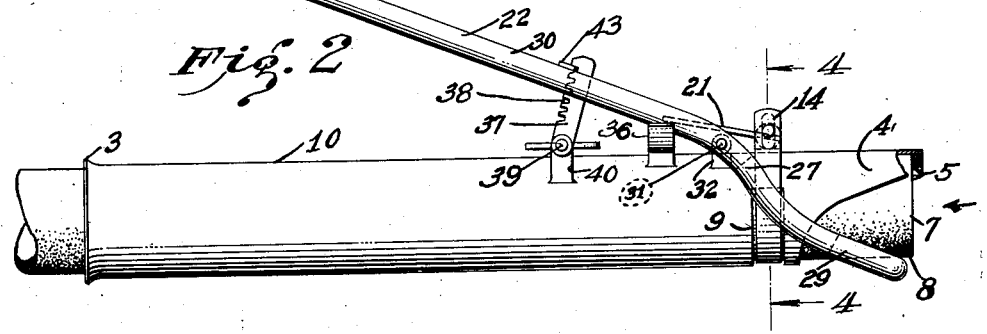
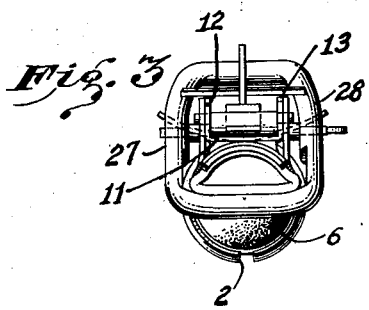 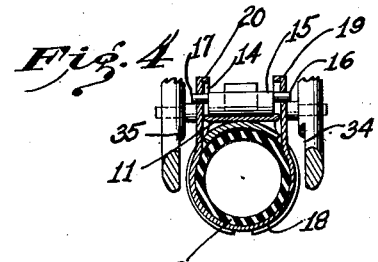
INVENTOR,
William B. Fulton;
BY
Calvin Brown,
ATTORNEY.

Patented Mar. 12, 1935

1,994,098

UNITED STATES PATENT OFFICE 1,994,098

MEANS FOR DEFORMING OR COMPRESSING FLEXIBLE MEMBERS

William B. Fulton, Eagle Rock, Calif.

Application October 6, 1932, Serial No. 636,460

3 Claims. (Cl. 251—5)

This invention relates broadly to means for deforming or compressing flexible members. More particularly, the invention has direct application to the ordinary type of garden hose, the member being utilized in conjunction with said hose in such a manner as to regulate the character of spray of a liquid body passed outwardly from said hose.

With reference to the preceding object, and within the purview of the invention, the device in combination with an end portion of a hose acts in such a manner as to provide a nozzle readily adjustable to direct a stream of liquid passing through the hose. The ordinary nozzle used with garden hose is rotated to provide for different character of liquid sprays. It is sometimes difficult to adjust the nozzle. With my invention, it is possible to regulate the character of the spray within a fraction of a second and to maintain the character of said spray, if desired.

The invention is readily adaptable for use with flexible members other than a garden hose, and the invention contemplates a member adapted to be utilized in conjunction with some flexible member through which a liquid is passed, and which member will closely grip and hold the flexible member without fear that said flexible member will escape from said means during actual operation.

Other objects include the provision of means of the character stated which is inexpensive in cost of manufacture, simple of construction, durable, fool proof in operation, and generally superior to ordinary types of nozzles.

With the above and other objects in view, the invention consists in the novel and useful provision, formation, construction, association and interrelation of parts, members and features, all as shown in a certain embodiment in the accompanying drawing, described generally, and more particularly pointed out in the claims.

In the drawing:

Figure 1 is a fragmentary top plan view of the invention shown in cooperation with a flexible hose, Figure 2 is a side elevation of the means shown in Figure 1, Figure 3 is a front elevation looking in the direction of the arrow 3 of Figure 2, and, Figure 4 is a sectional view on the line 4—4 of Figure 2.

Referring now to the drawing, 1 is a sleeve preferably formed of metal and split longitudinally, as shown at 2. One end of said sleeve 1 is provided with a bell 3 and the opposite end is formed with an extended lip 4. This lip constitutes a longitudinally extending segmental portion at what may be termed the top of the sleeve. The outer extremity of the lip is provided with an inwardly extending segmental flange 5. When a flexible hose 6 is passed through the bell 3 within the confines of the sleeve 1, outward movement beyond the end of the lip 4 is prevented by the end 7 of the said hose engaging the segmental flange 5. Thus, this segmental flange acts as a stop for the hose. It will also be observed that the hose is segmentally exposed at the zone 8, due to the formation of the lip. In the present instance, the end of the lip covers substantially 120° of arc and the curved surface of the hose is 240° of arc. I do not wish to be limited to this degree, as other degrees of arc may be as readily employed (see Figure 3). The said sleeve is provided with a transverse segmental slot 9 spaced rearwardly from the lip portion. In the present instance, the segmental slot subtends substantially the same arc as the surface of the hose adjacent the segmental flange 5, to-wit, 240°. However, I do not wish to be confined to this arc.

Secured to what I term the top of the sleeve, being that portion designated as 10, is a cross piece 11 provided with upstanding ends 12 and 13, each end being provided with a longitudinally extending slot 14 (see Figures 2 and 4). Adapted for placement between said ends is an eccentric roller 15 provided with end pin extensions 16 and 17. A segmental clamp 18 is adapted to be in part received within the segmental slot 9 and has end portions 19 and 20 paralleling and adjacent to the ends 12 and 13, as shown best in Figures 3 and 4. These end portions 19 and 20 are each provided with a transverse bore and the pins 16 and 17 are passed through the longitudinal bores of the members 12 and 13 and the bores 19 and 20. Secured to this cam roller is a lever 21. Thus, when the cam roller is in one position, to-wit, the position shown in Figure 2, the clamp is moved into tight engagement with the hose to clamp the hose within the sleeve. Releasing of the clamp is accomplished by revolving the lever 21 clockwise, viewing Figure 2. So far, I have thus provided a sleeve adapted to confine a flexible member, such as a hose, together with means for limiting outward movement of hose relative to said sleeve, and means for clamping the hose within said sleeve, after movement of the hose relative to the sleeve has been arrested. If water is now passed through the hose, the water will jet through the end of the hose 7 in a solid stream. However, it is not always desirable to have a solid stream but to spray the water, assuming water is the liquid used. To accomplish such a spraying, I have provided an operating lever, designated generally as 22, in the present instance, having two spaced apart side arms 23 and 24 and inter-connecting end pieces 25 and 26 therefor. It will be noted that the sides converge to a certain extent toward the inter-connecting end piece 25. This is done for purely structural reasons and for greater ease in handling the device, although the side pieces of the lever might be parallel, if desired. The lever is so arranged that each side piece is curvedly bent at 27 and 28 to provide portions 29 and 30 for both side pieces in out of the same plane relationship. A shaft 31 transversely extends between the side pieces 23 and 24, and said shaft is passed through a bearing 32 secured to the top of the sleeve in any appropriate manner.

Assuming the position of the lever as shown in Figure 2, it will be seen that the end piece 26 is in engagement with a portion of the periphery of the hose and that upward movement of the end piece 26 will serve to compress the hose between the lip and said portion 26. This is illustrated in Figure 3. In order to assure that there should be no binding between side pieces of the lever and the clamp, I have relieved the side pieces at 33 and 34. In addition, I have flattened, to a certain extent, the end piece 26 where it engages the hose. By curvedly bending the lever, as shown at 27 and 28, it is possible to shorten the length of the sleeve, that is, the length of the sleeve outwardly from the pivot point of said lever with the sleeve. The lever 22 is normally maintained in the position shown in Figure 2 through the medium of a leaf spring 36. This leaf spring is transversely secured to the sleeve and has end portions thereof resiliently engaging sides 23 and 24 of the lever. The hand portion of the lever will, of course, be normally urged upwardly due to the resilience of the hose and the leaf spring further assists said movement. Thus, in operation, the operator may grasp both the lever and the sleeve and by depressing the hand portion, to-wit, the portion between the end piece 25 and the shaft 31, be able to regulate the character of spray of the liquid emitted from the end of the hose. However, as the holding of the lever might become tiresome, I have provided further means, designated generally as 37 for holding the lever in any selected position. This means constitutes a rack 38 having the usual teeth, one end of said rack being secured to a shaft 39, the shaft being mounted in bearing blocks 40 and 41, which bearing blocks are secured to the sleeve. One end of said shaft is provided with a finger piece 42, whereby the shaft may be turned and thus rock the rack. I provide a member 43 transversely extending between sides of the lever and which member is adapted to be engaged by a selected tooth of said rack. Thus, by rocking the rack in one direction, the teeth may be released from the transverse piece 43, whereupon the lever may be moved to a second position and a tooth of the rack again caused to inter-engage the transverse piece 43.

The operation, uses and advantages of the invention just described are as follows:

It is evident that I do not have to provide the usual fittings for the free end of the hose in order to secure some type of nozzle for the reason that on releasing the clamp 18, a length of the hose may be pushed through the sleeve, the sleeve readily expanding to accomplish this, due to the longitudinal split 2 until an end of the said hose engages the segmental flange 5 adjacent the end of the lip 4 of the sleeve. The lever 21 is then rotated to the left of the showing of Figure 2 or to the position shown in said figure, to the end that said clamp will bind the hose within the sleeve and prevent further movement of the hose. The rack may be disengaged from the transverse piece 43 and after the operator has moved the lever to any desired position to compress the end portion 8 of the hose, the rack may be rotated through the medium of the finger piece 42 to where it may engage the member 43 and thus hold the lever against movement. In this way, different character of liquid sprays may be effected in an easy and economical manner.

Actual experience has shown that a device of this character does not cause the hose to deteriorate rapidly and if the hose is damaged by frequent compressing thereof, the portion damaged may be readily cut away, it being noted that the degree of cut required is reasonably small.

I may within the purview of the invention provide a short length of hose carrying a coupling and this short length received within the sleeve in place of utilizing the entire length of the hose, if desired.

It may be pointed out that the presence of the clamp is essential for the reason that the hose or other flexible member must be held within the sleeve in such a manner that relative movement between the sleeve and the hose is prevented after the end of the hose engages the segmental flange 5, the reason being that when the lever tends to compress the hose, back pressure of liquid within the hose occurs and this back pressure is sometimes sufficient to cause the sleeve to be moved relative to the hose to such an extent that the end 26 of the lever would no longer engage the hose. The presence of the clamp, however, assures that this will not occur.

It is obvious that various changes and modifications and variations may be made in practicing the invention in departure from the particular showing of the drawing without departing from the true spirit thereof.

I claim:

1. In a device of the character disclosed, a sleeve formed with an extended lip, said sleeve being adapted to confine a flexible tube, said tube being so positioned beneath the lip that a portion of the periphery of said tube is exposed therebeneath, said sleeve being provided with a segmental slot adjacent the extended lip, and a clamp within said segmental slot and engaging the periphery of said sleeve for clamping said tube within said sleeve, and a clamping lever formed to cooperate with the extended lip of the sleeve to compress said flexible tube positioned therebetween.

2. In a device of the character disclosed, a sleeve adapted to confine a flexible tube, said sleeve being formed at one end with a segmental cut-away portion to provide a lip, the segmental cut-away portion exposing a portion of said tube, a lever comprising two side arm portions and interconnecting end members and being pivotally secured to said sleeve with a portion of said side arms straddling sides of the sleeve, with one end portion thereof beneath the said tubing, whereby movement of the lever in one direction will depress said tube between the end portion of the lever and the lip.

3. In a device of the character disclosed, a sleeve adapted to confine a flexible tube, said sleeve being formed at one end with a segmental cut-away portion to provide a lip, the segmental cut-away portion exposing a portion of said tube, a lever comprising two side arm portions and interconnecting end members and being pivotally secured to said sleeve with a portion of said side arms straddling sides of the sleeve, with one end portion thereof beneath the said tubing, whereby movement of the lever in one direction will depress said tube between the end portion of the lever and the lip, and means between said sleeve and the lever for maintaining the lever in tube depressing position.

WILLIAM B. FULTON.